(12) United States Patent
Xu (10) Patent No.: US 10,645,447 B2
(45) Date of Patent: May 5, 2020

(54) FAST CHANNEL CHANGE METHOD AND SERVER, AND IPTV SYSTEM

(71) Applicant: Huawei Technologies Co., Ltd., Shenzhen (CN)

(72) Inventor: Yahui Xu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/003,547

(22) Filed: Jun. 8, 2018

(65) Prior Publication Data

US 2018/0295411 A1    Oct. 11, 2018

Related U.S. Application Data

(63) Continuation of application No. PCT/CN2016/094236, filed on Aug. 9, 2016.

(30) Foreign Application Priority Data

Dec. 10, 2015 (CN) .......................... 2015 1 0918525

(51) Int. Cl.
*H04N 21/438* (2011.01)
*H04N 21/6405* (2011.01)
(Continued)

(52) U.S. Cl.
CPC ..... *H04N 21/4383* (2013.01); *H04N 7/17318* (2013.01); *H04N 21/233* (2013.01); *H04N 21/234* (2013.01); *H04N 21/236* (2013.01); *H04N 21/2393* (2013.01); *H04N 21/23608* (2013.01); *H04N 21/266* (2013.01); *H04N 21/26616* (2013.01); *H04N 21/434* (2013.01); *H04N 21/439* (2013.01); *H04N 21/4384* (2013.01); *H04N 21/44* (2013.01); *H04N 21/6405* (2013.01); *H04N 21/6408* (2013.01); *H04N 21/64322* (2013.01)

(58) Field of Classification Search
None
See application file for complete search history.

(56) References Cited

U.S. PATENT DOCUMENTS 6,298,089 B1 * 10/2001 Gazit .................. G11B 27/036
375/240.28
2005/0081244 A1 * 4/2005 Barrett .................. H04L 12/185
725/97

(Continued)

FOREIGN PATENT DOCUMENTS

CN           1949879 A       4/2007
CN         101237586 A       8/2008
(Continued)

*Primary Examiner* — Jason K Lin
(74) *Attorney, Agent, or Firm* — Slater Matsil, LLP (57) ABSTRACT

Embodiments of the present invention provide a fast channel change method and a fast channel change server. After receiving a fast channel change request of user equipment, the fast channel change server adjusts a time interval between a video packet and a corresponding audio packet in a channel multicast packet, and sends an adjusted channel multicast packet to the user equipment. In this way, an audio and video synchronization time after the user equipment receives a channel data packet is reduced.

14 Claims, 8 Drawing Sheets

(51) Int. Cl.
*H04N 21/643* (2011.01)
*H04N 21/236* (2011.01)
*H04N 21/6408* (2011.01)
*H04N 21/239* (2011.01)
*H04N 7/173* (2011.01)
*H04N 21/266* (2011.01)
*H04N 21/233* (2011.01)
*H04N 21/234* (2011.01)
*H04N 21/434* (2011.01)
*H04N 21/439* (2011.01)
*H04N 21/44* (2011.01)

(56) References Cited

U.S. PATENT DOCUMENTS

| | | | |
|---|---|---|---|
| 2007/0081562 | A1 | 4/2007 | Ma |
| 2009/0148131 | A1 | 6/2009 | Akgul |
| 2010/0088721 | A1 | 4/2010 | Hong et al. |
| 2010/0115566 | A1 | 5/2010 | Haimi-Cohen |
| 2010/0229211 | A1 | 9/2010 | Lee et al. |
| 2010/0254462 | A1 | 10/2010 | Friedrich et al. |
| 2011/0219414 | A1 | 9/2011 | Guo et al. |
| 2011/0221959 | A1* | 9/2011 | Ben Yehuda .... H04N 21/23608 348/512 |
| 2011/0293021 | A1* | 12/2011 | Kotalwar ............. H04N 21/233 375/240.26 |
| 2012/0063462 | A1* | 3/2012 | Hu .................... H04N 21/23608 370/394 |
| 2012/0084826 | A1 | 4/2012 | Xu et al. |
| 2012/0303760 | A1 | 11/2012 | Begen et al. |
| 2012/0304236 | A1 | 11/2012 | Qiu et al. |
| 2014/0126653 | A1 | 5/2014 | Begen et al. |
| 2014/0300815 | A1 | 10/2014 | Dabrowa et al. |
| 2019/0191212 | A1* | 6/2019 | Sljivic ................. H04L 65/4076 |

FOREIGN PATENT DOCUMENTS

| | | |
|---|---|---|
| CN | 101742269 A | 6/2010 |
| CN | 101854533 A | 10/2010 |
| CN | 101909196 A | 12/2010 |
| CN | 103347207 A | 10/2013 |
| CN | 103607664 A | 2/2014 |
| CN | 103858437 A | 6/2014 |
| CN | 104144359 A | 11/2014 |
| CN | 104410894 A | 3/2015 |
| CN | 104426875 A | 3/2015 |
| CN | 105376613 A | 3/2016 |
| EP | 2071850 A1 | 6/2009 |
| KR | 20080061583 A | 7/2008 |

* cited by examiner

FAST CHANNEL CHANGE METHOD AND SERVER, AND IPTV SYSTEM

CROSS-REFERENCE TO RELATED APPLICATIONS

This application is a continuation of International Application No. PCT/CN2016/094236, filed on Aug. 9, 2016, which claims priority to Chinese Patent Application No. 201510918525.8, filed on Dec. 10, 2015. The disclosures of the aforementioned applications are hereby incorporated by reference in their entireties.

TECHNICAL FIELD

Embodiments of the present invention relate to Internet Protocol television (IPTV) technologies, and in particular, to a fast channel change method applied to an IPTV system, and a corresponding device.

BACKGROUND

An IPTV multicast channel change delay is an important factor of a Quality of Experience (QoE) indicator of an IPTV service. The channel change delay is a time from a point at which a user operates a remote control to initiate a channel change request to a point at which an image of a requested channel appears on a television screen.

A channel change of IPTV is different from that of conventional television and digital television. In a conventional cable television network, a terminal receives all channel signals at the same time, and a channel change time is approximately 0.5 second. Because of a decoding process, a channel change time of the digital television is slightly longer than that of cable television, but is generally below 1 second. The IPTV is limited by bandwidth of an access network, and a terminal can receive only one channel signal at a time. In addition, a channel change process of the IPTV requires complex network signaling interworking. As a result, an accumulated IPTV multicast channel change delay may be relatively long.

A fast channel change (FCC) is a method for reducing a channel change time by delivering, by an FCC server, a special unicast program stream beginning with an I-frame. By means of FCC service deployment in a network, an I-frame waiting time and a network signaling interworking time can be avoided, and an I-frame transmission speed can be increased, thereby increasing a channel change speed.

However, during channel change processing, playback of a channel image depends on whether the terminal can receive both a video packet and a corresponding audio packet, but an interval between an audio packet and a video packet in a channel live stream in an existing network cannot be controlled, which restricts delay control of an FCC fast channel change. Therefore, a delay of normal playback (a moving image fully synchronized with a sound) of a target channel after the channel change is increased, and user experience is affected.

SUMMARY

In view of this, it is necessary to provide a fast channel change method, a device, and a system, to reduce an audio and video synchronization time of user equipment, and increase a channel change speed.

According to a first aspect, an FCC method is provided, including: accessing, by an FCC server, a channel multicast group, and receiving a channel multicast packet. After receiving a fast channel change request sent by user equipment, a time interval between an audio packet and a video packet in the channel multicast packet is adjusted. Then an adjusted multicast packet is sent to the user equipment in unicast mode, where specifically, a time interval between a video packet in the channel multicast packet and an audio packet corresponding to the video packet is reduced. In this way, after the user equipment receives the adjusted channel multicast packet from the FCC server, audio and video synchronization can be quickly performed, so that a channel change speed is increased, and user experience is improved.

In a first implementation of the first aspect, a specific manner in which the FCC server adjusts the channel multicast packet is as follows: first, determining a video packet in which a start I-frame is located and that needs to be sent to the user equipment; then obtaining a presentation time stamp (PTS) of the video packet; backward searching for, according to the PTS of the video packet, an audio packet corresponding to the video packet; and then replacing the first audio packet after the video packet with the audio packet. That is, a location of the audio packet corresponding to the video packet is moved forward, to reduce a time interval between the video packet and the audio packet.

In a second implementation of the first aspect, the FCC server further performs corresponding processing on audio packets subsequent to the audio packet corresponding to the video packet in which the start I-frame is located. Specifically, the FCC server first determines an original location of the audio packet corresponding to the video packet in which the I-frame is located and a location of the first audio packet after the video packet, then determines, according to the two determined locations, a forward movement interval of the audio packet corresponding to the video packet in which the I-frame is located, and then forward moves, in sequential order according to the forward movement interval, the audio packets subsequent to the audio packet corresponding to the video packet, to replace audio packets at forward movement locations. In this way, the FCC server ensures that enough channel data is sent to the user equipment, so that the user equipment successfully switches to the channel multicast group, to ensure channel playback continuity.

In a third implementation of the first aspect, after sending, to the user equipment, the adjusted packet obtained after the audio and video time interval is adjusted, and before switching to an original channel multicast packet, the FCC server further sends a transitional packet to the user equipment to avoid sending a duplicate audio packet, where the transitional packet is generated after the FCC server replaces an audio packet in the original channel multicast packet with a null packet. Duration of the transitional packet is determined according to a forward movement interval of the audio packet corresponding to the video packet. In this implementation, repeated sending of the audio packet can be avoided, and network resource consumption can be reduced.

According to a second aspect, an FCC server is provided, including a receiving unit, a processing unit, and a sending unit, where the receiving unit is configured to receive a fast channel change request sent by user equipment; the processing unit is configured to adjust a time interval between a video packet and an audio packet in a channel multicast packet; and the sending unit is configured to send a channel multicast packet processed by the processing unit to the user equipment. The FCC server can perform re-encapsulation processing on the channel multicast packet received from a channel multicast group, adjust a time interval between a video packet and a corresponding audio packet in the multicast packet, and after receiving the fast channel change request sent by the user equipment, send the adjusted and re-encapsulated channel multicast packet to the user equipment in unicast mode, so that an audio and video synchronization time of the user equipment is reduced, and a channel change speed is increased.

Specifically, the processing unit may be configured to perform steps of generating the adjusted packet and the transitional packet in the fast channel change method.

According to a third aspect, an FCC server is provided, including a receiver, a processor, a transmitter, and a memory, where the memory is configured to store a program instruction, and the processor is configured to execute the program instruction stored in the memory, to implement the foregoing FCC method.

According to a fourth aspect, user equipment is provided, including: a sending unit, configured to send an FCC request to an FCC server; a receiving unit, configured to receive an adjusted packet that is obtained after a time interval between an audio packet and a video packet in an original channel multicast packet is adjusted and that is sent by the FCC server based on the FCC request; and a processing unit, configured to parse and play the adjusted packet.

According to a fifth aspect, a user terminal is provided, including a receiver, a processor, a transmitter, and a memory, where the memory is configured to store a program instruction, and the processor is configured to execute the program instruction stored in the memory, to implement the foregoing FCC method.

According to a sixth aspect, an IPTV system is provided, including the FCC server described in the second or the third aspect, and further including a content providing system, configured to: after the channel change server accesses a channel multicast group, multicast channel media content to the channel change server by using a multicast packet. Optionally, the IPTV system may further include the user equipment described in the fourth or the fifth aspect.

According to the FCC method and server, and the system provided in the solutions of the present invention, after receiving a channel multicast stream, the FCC server adjusts an audio and video time interval in a unicast stream sent to a single user; and after receiving a fast channel change request of user equipment, the FCC server adjusts a time interval between an audio packet and a video packet in a channel multicast packet, and sends an adjusted channel multicast packet to the user equipment in burst mode. In this way, an audio and video synchronization time of the user equipment is reduced, and a channel change speed is increased.

DETAILED DESCRIPTION OF ILLUSTRATIVE EMBODIMENTS

The following further describes the technical solutions in the embodiments of the present invention with reference to the accompanying drawings in the embodiments of the present invention.

Figure 1:
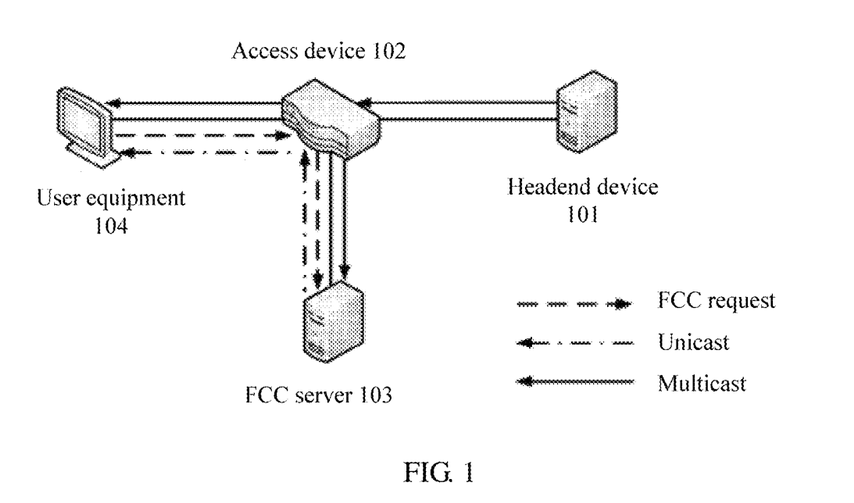
FIG. 1 is a schematic diagram of an application scenario according to an embodiment of the present invention.

FIG. 1 is a schematic diagram of an application scenario according to an embodiment of the present invention.

As shown in FIG. 1, this embodiment of the present invention is applied to an IPTV service. An IPTV service system includes at least a headend device 101, an access device 102, an FCC server 103, and user equipment 104. The headend device 101 is configured to: obtain media content of a channel from an external content source, and convert, by means of compression coding processing, the media content to a media file or a media stream meeting an IPTV service format requirement. The access device 102 is configured to: obtain the media file or the media stream of the channel from the headend device 101, and provide the media file or the media stream to the user equipment 104. The FCC server 103 is configured to continuously cache (in a short time) multicast streams of all channels to support a fast channel change. The FCC server sends the cached multicast streams to the user equipment 104 in unicast mode, thereby reducing impact of a delay on a multicast change process and implementing the fast channel change. The user equipment 104 is configured to: apply, by using the Internet Group Management Protocol (IGMP), to the access device for joining a multicast group, and obtain a live media stream from the access device, and is further configured to obtain the media stream of the channel from the FCC server in unicast mode for the fast channel change. Optionally, the IPTV system may further include a scheduling device, configured to: record an FCC server address and provide an FCC server address corresponding to a channel to the user equipment. The user equipment may be a conventional set top box, a smart set top box, a smart television integrated with a set top box function, or another intelligent terminal device, and reference may also be made to a general-purpose computer device in FIG. 2. The FCC server may be the computer device shown in FIG. 2.

Figure 2:
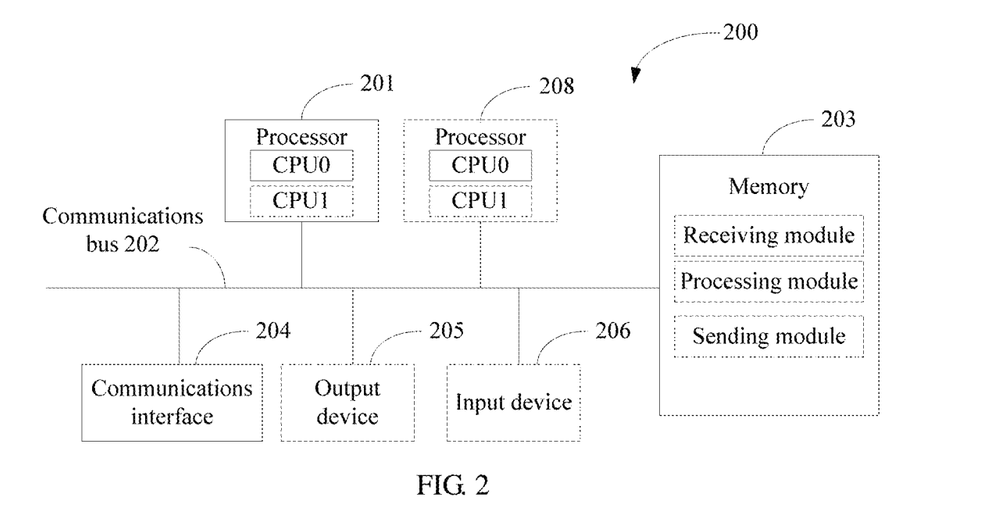
FIG. 2 is a schematic diagram of a computer device according to an embodiment of the present invention.

FIG. 2 is a schematic diagram of a computer device 200 according to an embodiment of the present invention. The computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control program execution in solutions of the present invention.

The communications bus 202 may include a path for transferring information between the foregoing components. The communications interface 204 uses any type of transceiver device, and is configured to communicate with another device or a communications network, such as Ethernet, a radio access network (RAN), or a wireless local area network (WLAN).

The memory 203 may be a read-only memory (ROM) or another type of static storage device capable of storing static information and an instruction, or a random access memory (RAM) or another type of dynamic storage device capable of storing information and an instruction; or may be but be not limited to an electrically erasable programmable read-only memory (EEPROM), a compact disc read-only memory (CD-ROM), or another compact disc storage, an optical disc storage (including a compact disc, a laser disc, an optical disc, a digital versatile disc, a Blu-ray disc, and the like), or magnetic disk storage medium or another magnetic storage device, or any other medium that can carry or store expected program code having an instruction or data structure form and can be accessed by using a computer. The memory may exist independently, and is connected to the processor by using the bus. Alternatively, the memory may be integrated with the processor.

The memory 203 is configured to store application program code used to execute the solutions of the present invention, and the execution is controlled by using the processor 201. The processor 201 is configured to execute the application program code stored in the memory 203.

During specific implementation, in an embodiment, the processor 201 may include one or more CPUs, for example, a CPU0 and a CPU1 in FIG. 2.

During specific implementation, in an embodiment, the computer device 200 may include multiple processors, for example, the processor 201 and a processor 208 in FIG. 2. Each of these processors may be a single-core processor, or may be a multi-core processor. The processor herein may be one or more devices, circuits, and/or processing cores for processing data (for example, a computer program instruction).

During specific implementation, in an embodiment, the computer device 200 may further include an output device 205 and an input device 206. The output device 205 communicates with the processor 201, and may display information in various manners. For example, the output device 205 may be a liquid crystal display (LCD), a light emitting diode (LED) display device, a cathode ray tube (CRT) display device, a projector, or the like. The input device 206 communicates with the processor 201, and may receive an input of a user in various manners. For example, the input device 206 may be a mouse, a keyboard, a touchscreen device, a sensing device, or the like.

The computer device 200 may be a general-purpose computer device or a special-purpose computer device. During specific implementation, the computer device 200 may be a desktop computer, a portable computer, a network server, a personal digital assistant (PDA), a mobile phone, a tablet computer, a wireless terminal device, a communications device, a built-in device, or a device with a structure similar to that shown in FIG. 2. A type of the computer device 200 is not limited in this embodiment of the present invention.

The FCC server shown in FIG. 1 may be the device shown in FIG. 2, and a memory of the FCC server 103 stores one or more software modules. The FCC server 103 may use a processor and program code in the memory to implement the software modules, thereby implementing a fast channel change.

Alternatively, the user equipment shown in FIG. 1 may be the device shown in FIG. 2, and the user equipment 104 may use a processor and program code in a memory to implement software modules, thereby implementing a fast channel change.

Figure 3:
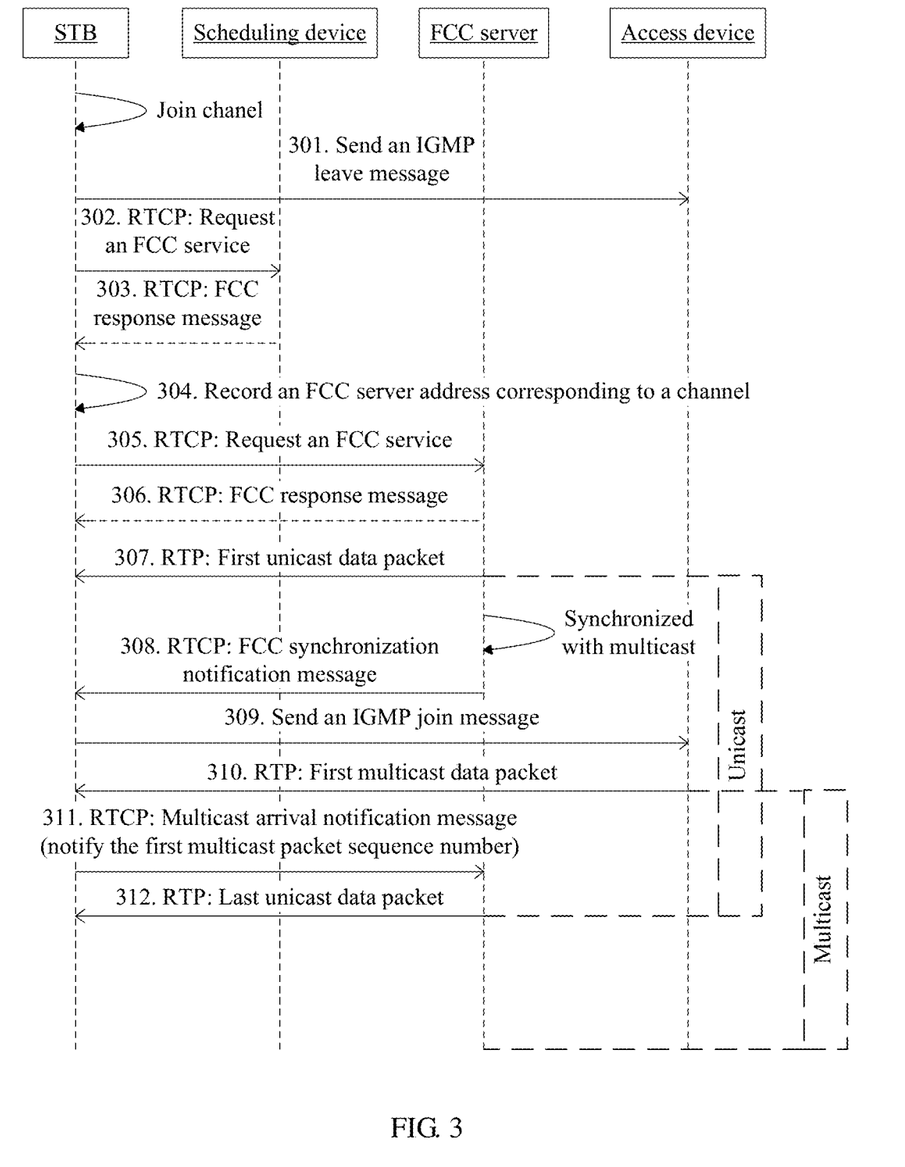
FIG. 3 is a signaling interworking diagram of implementation of a fast channel change in an existing IPTV service.

In an existing IPTV service, a process of implementing a fast channel change is shown in FIG. 3.

301. After a user initiates a target channel change request by using a remote control, a set top box (STB) sends an IGMP leave message for leaving a multicast group of a current channel to an access device.

302. If the STB determines that there is no cached FCC server address corresponding to a target channel, the STB initiates an FCC request to a scheduling server in a form of an RTP Control Protocol (RTCP) message; or if the STB determines that there is a cached FCC server address corresponding to a channel, the STB performs step 305 to initiate an FCC request to an FCC server in a form of an RTCP message, where RTP is the Real-Time Transport Protocol.

303. When the scheduling server receives the FCC request initiated by the STB, the scheduling server selects a proper FCC server address, and returns an FCC request response message.

304. The STB records the FCC server address that is corresponding to the channel and that is returned by the scheduling server.

305. The STB initiates the FCC request to the FCC server in the form of the RTCP message.

306. The FCC server returns a FCC response to the STB.

307. The FCC server starts to send a unicast stream to the STB at a burst rate from an I-frame in a cache. Specifically, the FCC server performs pushing one or two groups of pictures (GOP) ahead according to a current multicast packet status, where a GOP means a group of IPB frames. For example, if a channel is changed at a frame 7, pushing starts at a frame 5 or a frame 1. The burst rate means that a unicast packet sending rate is n times, for example, 1.5 times a multicast packet sending rate. A higher rate is used, so that unicast pushing can catch up with schedule of an existing multicast stream, to trigger a unicast and multicast synchronization notification. A pushing rate herein may be controlled, so as to avoid a data loss caused by link congestion when a unicast stream and a multicast stream are sent at the same time.

308. The FCC server sends the unicast stream in burst mode until a live point, and when a multicast packet received by the FCC server is synchronized with a unicast packet sent by the FCC server, the FCC server determines that multicast has been synchronized with unicast, and instructs the STB to join the multicast.

309. The STB sends an IGMP join message to the access device to join a target channel multicast group.

310. The STB receives a first multicast packet of the target channel from the access device.

311. The STB notifies the FCC server that the STB has received the multicast stream, and notifies the FCC server of a first multicast packet sequence number.

312. The FCC server continues to send the unicast stream until a data packet corresponding to the first multicast packet sequence number.

The FCC server receives and records the first multicast packet sequence number, and then continues to push the unicast packet until the sequence number. An FCC process ends.

In the foregoing fast channel change solution, in the multicast stream received by the FCC server from the access device, a time interval between an audio packet and a video packet cannot be controlled, and when an audio and video time interval of an original live source is relatively large, an audio and video synchronization time cannot be reduced. As a result, a channel change time is relatively long.

In some embodiments of the present invention, after receiving a channel multicast stream, the FCC server adjusts an audio and video time interval in a unicast stream sent to a single user. After receiving a FCC request of user equipment, the FCC server adjusts a time interval between an audio packet and a video packet in a channel multicast packet, and sends an adjusted channel multicast packet to the user equipment in burst mode. In this way, an audio and video synchronization time of the user equipment is reduced, and a channel change speed is increased.

Specifically, after receiving an RTP packet from a multicast group, the FCC server restores the RTP packet to transport stream (TS) packets by means of decapsulation, and records a presentation time stamp (PTS) of each TS packet. The PTS is used to indicate a time at which a presentation unit appears in a system target decoder (STD), and is defined by an encoder for specifying a presentation time of a unit for the decoder. When receiving a channel change request of the set top box, the FCC server determines an I-frame sent to the user, finds, according to a PTS of the I-frame, an audio TS packet close to the PTS, forward moves the audio TS packet to an audio packet location closest to a video packet at which the I-frame is located, re-encapsulates the video TS packet and the audio TS packet into an RTP packet, and sends the RTP packet to the set top box, to ensure that an audio PTS and a video PTS of a bitstream received by the set top box are basically the same. After ensuring that enough data is sent, the FCC server performs transitional restoration for the RTP packet on which an audio and video adjustment is performed, and restores consistency between unicast data of the user and an RTP packet of the multicast stream. Then the FCC server instructs the set top box to leave unicast and join a multicast service.

Figure 4:
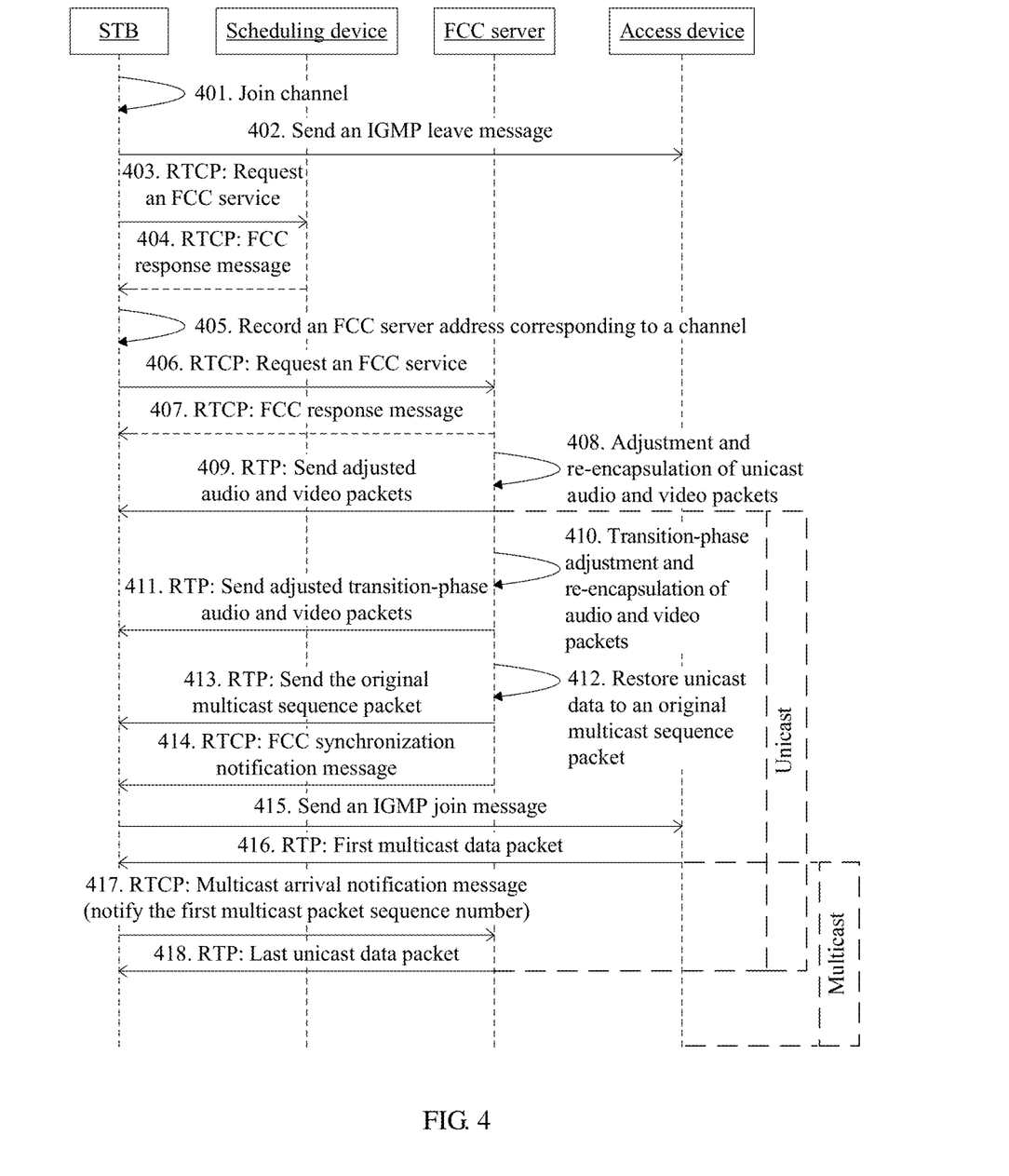
FIG. 4 is a signaling interworking diagram of an FCC method according to an embodiment of the present invention.

The following further describes the solutions of the present invention with reference to FIG. 4. FIG. 4 is a signaling interworking diagram according to an embodiment of the present invention. As shown in the figure, signaling interworking between devices is as follows.

401. A user initiates a target channel change request by using a remote control.

402. An STB sends an IGMP leave message for leaving a multicast group of a current channel to an access device.

403. If the STB determines that there is no cached FCC server address corresponding to a target channel, the STB initiates an FCC request to a scheduling server in a form of an RTCP message; or if the STB determines that there is a cached FCC server address corresponding to a target channel, the STB directly performs step 406, and initiates an FCC request to an FCC server in a form of an RTCP message.

404. When the scheduling server receives the FCC request initiated by the STB, the scheduling server selects a proper FCC server address, and returns an FCC request response message.

405. The STB records the FCC server address that is corresponding to the channel and that is returned by the scheduling server.

406. The STB initiates the FCC request to the FCC server in the form of the RTCP message.

407. The FCC server returns an FCC response to the STB.

408. The FCC server adjusts a time interval between an audio packet and a video packet in a multicast packet received from the multicast group, and performs re-encapsulation to generate an adjusted packet. For specific adjustment and re-encapsulation methods, refer to descriptions of FIG. 5A, FIG. 5B, and FIG. 5C, and FIG. 6A and FIG. 6B.

409. The FCC server sends an adjusted and re-encapsulated audio and video packet, that is, the adjusted packet, to the STB.

410. The FCC server replaces an audio packet in the multicast packet received from the multicast group with a null packet, to generate a transitional packet. For a specific generation method, refer to the descriptions of FIG. 5A, FIG. 5B, and FIG. 5C, and FIG. 6A and FIG. 6B.

411. The FCC server sends the transitional packet to the STB.

412. The FCC server restores a unicast packet to an original multicast sequence packet.

413. The FCC server sends the original multicast sequence packet to the STB.

414. The FCC server sends a unicast stream in burst mode until a live point, and when a multicast packet received by the FCC server is synchronized with the unicast packet sent by the FCC server, the FCC server determines that multicast has been synchronized with unicast, and instructs the STB to join the multicast.

415. The STB sends an IGMP join message to the access device to join a target channel multicast group.

416. The STB receives a first multicast packet of the target channel from the access device.

417. The STB notifies the FCC server that the STB has received a multicast stream, and notifies the FCC server of a first multicast packet sequence number.

418. The FCC server continues to send the unicast stream to the STB until a data packet corresponding to the first multicast packet sequence number.

The FCC server receives and records the first multicast packet sequence number, and then continues to push the unicast packet until the sequence number. An FCC process ends.

According to the foregoing fast channel change method, the FCC server adjusts and re-encapsulates the received channel multicast packet, to reduce the time interval between the audio packet and the video packet in the original channel multicast packet. In this way, it is ensured that the time interval between the audio and video packets is controllable, an audio and video synchronization time of the set top box is reduced, a channel change speed is increased, and user experience is improved.

Figure 5A:
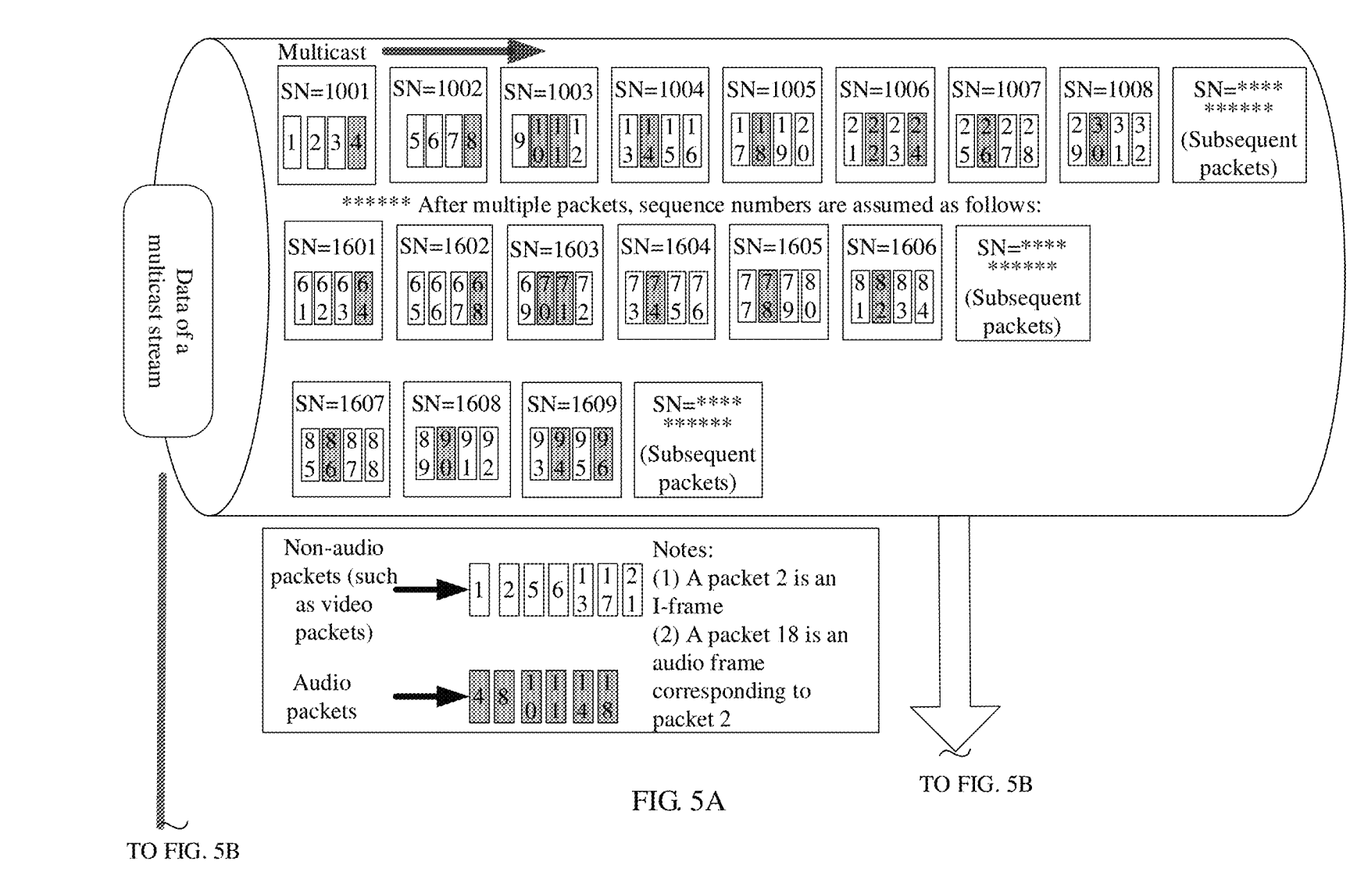
FIG. 5A, FIG. 5B, and FIG. 5C are a schematic diagram of a multicast packet adjustment manner according to an embodiment of the present invention.
Figure 5B:
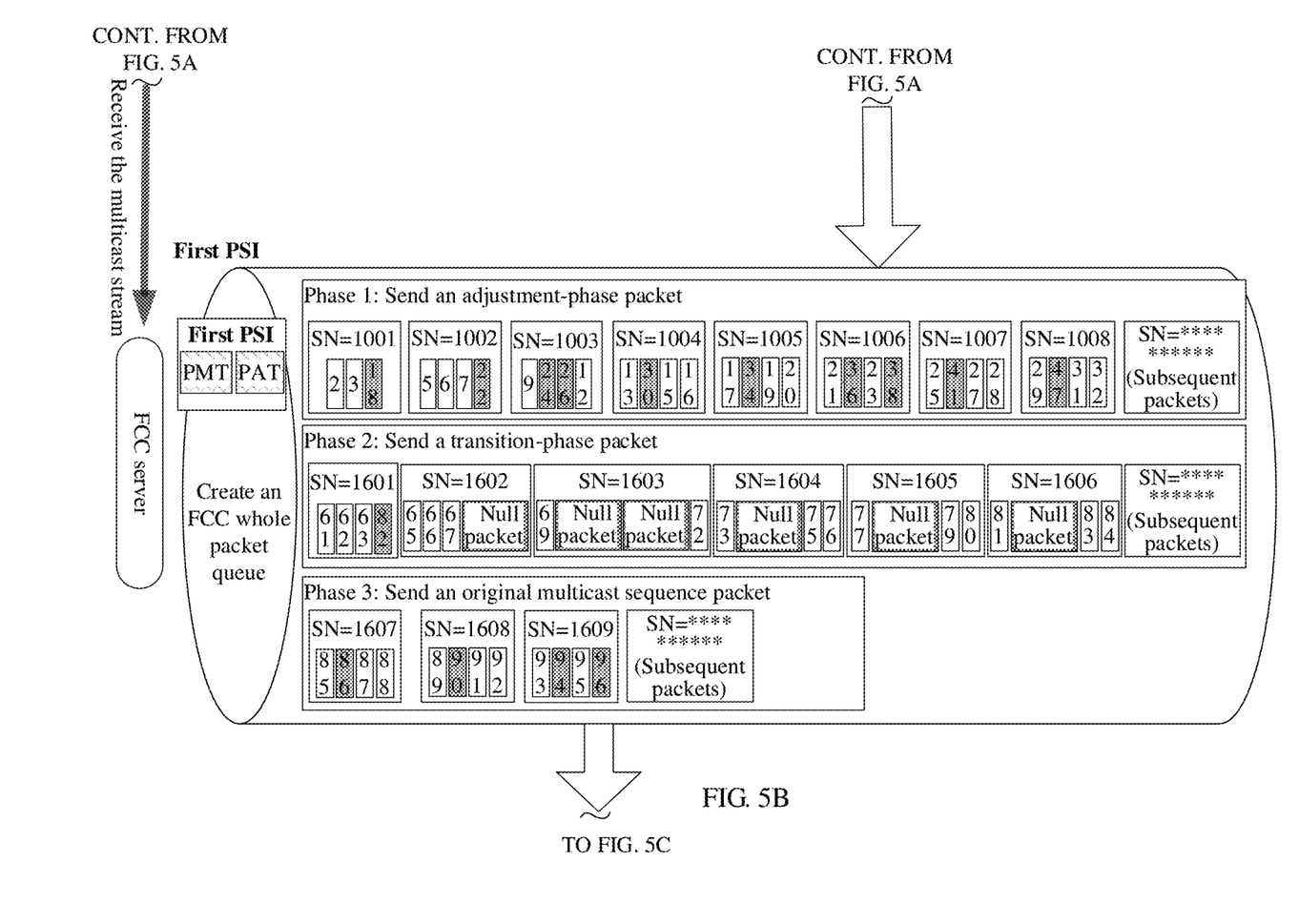
Figure 5C:
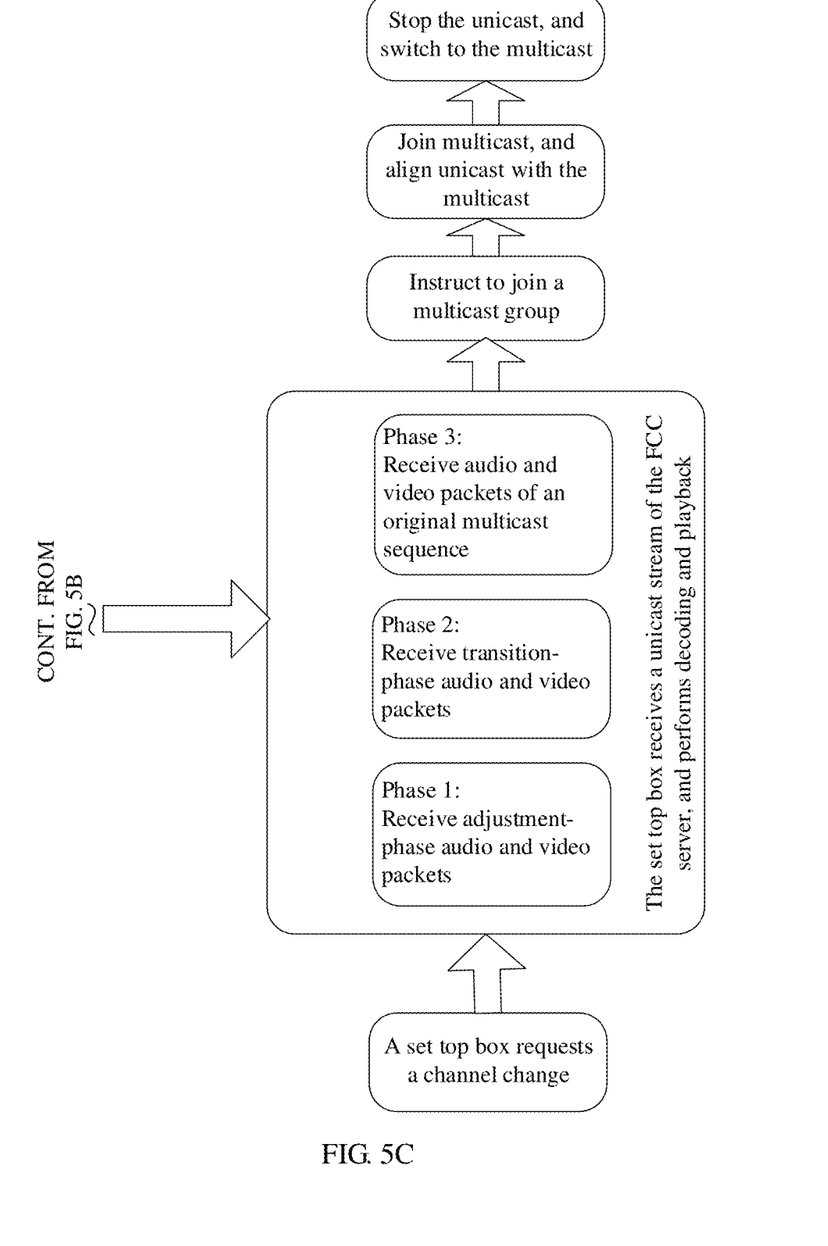

The following further describes a multicast packet adjustment manner in the embodiments of the present invention by using FIG. 5A, FIG. 5B, and FIG. 5C as an example.

First, an FCC server joins multicast groups of all channels, and receives multicast streams of all the channels. In an example of a target channel, the target channel is a channel to which a user wants to change. The FCC server receives a multicast stream of the target channel from an access device, and caches the multicast stream. The multicast stream is delivered in a form of an RTP stream, the RTP stream includes RTP packets, and each RTP packet has a sequence number (SN). In addition, each RTP packet further includes TS packets, a transport stream includes one or more programs, and each program is a combination of one or more original streams and other streams, including a video stream, an audio stream, a program-specific information (PSI) stream, and another data packet. PSI needs to be sent to a set top box before the video stream and the audio stream, so that the set top box decodes the video stream and the audio stream according to the PSI. There are mainly four types of PSI tables: a program association table (PAT), a program map table (PMT), a network information table (NIT), and a conditional access table (CAT). A main function of the program association table PAT is to provide each multiplexed transport stream with a program included in the transport stream, a program number, and a location of a PMT of the corresponding program. The PMT indicates content included in the program, that is, streams of the program, types (audio, video, and data) of the streams, and locations of the streams of the program, that is, a packet identifier (PID) value of a corresponding TS packet. The CAT mainly provides related information and related parameters of a conditional access system in a multiplexed stream. The NIT provides information about multiple groups of transport streams and information related to a transport network, and the information includes a transport stream descriptor, a channel frequency, a satellite launcher number, a modulation characteristic, and the like.

A length of the TS packet is fixed at 188 bytes. The TS packet includes a synchronization byte (sync byte) 0x47, a packet identifier PID, and the like. The PID is a 13-bit field, and indicates a type of data stored in a packet payload. It may be determined, according to the PID, whether a type of data carried behind the TS packet is a video stream, an audio stream, PSI, or another data packet.

As shown in the figure, TS packets 1, 2, 5, 6, 13, 17, and 21 are non-audio packets (for example, video packets), and TS packets 4, 8, 10, 11, 14, and 18 are audio packets, where the packet 2 is I-frame data, and the packet 18 is an audio packet corresponding to the packet 2.

After receiving an FCC request of the STB, the FCC server sends audio and video packets to the STB in three phases.

Phase 1: Send an adjustment-phase adjusted packet to the STB.

Phase 2: Send a transition-phase transitional packet to the STB.

Phase 3: Send an original multicast sequence packet to the STB.

In phase 1, it is assumed that an original audio and video time interval of the target channel is M milliseconds (generally, a typical value is approximately 800 milliseconds). The time interval is also a difference between a PTS of a video packet and a PTS of the first audio packet after the video packet. For example, if an interval between the packet 2 and the packet 18 is M milliseconds, a PTS difference between the packet 2 and the packet 4 is M. An adjusted audio and video time interval is N milliseconds (generally, a typical value is approximately 100-200 milliseconds), where M>N. First, the FCC server needs to determine, with reference to STB multicast join duration and a maximum audio and video interval difference, an I-frame sent to the STB. Duration from a location at which the I-frame is sent to a live point needs to be greater than at least the duration M of the original audio and video interval. If duration from a location at which the I-frame is sent to a live point is not greater than the duration M of the original audio and video interval, an audio frame corresponding to the I-frame cannot be adjusted to a location close to the I-frame. For example, the FCC server performs pushing one or two GOPs backward according to a currently received multicast packet. For example, if a channel is changed at a frame 1, pushing starts at a frame 5. After determining the I-frame, the FCC server searches for an audio TS packet, where a time interval between a PTS of the audio TS packet and a PTS of the I-frame is below N milliseconds, and backward searches for, according to the PTS of the I-frame, an audio packet closest to the I-frame, where an interval between a PTS of the audio packet and the PTS of the I-frame is below N milliseconds, that is, an audio packet corresponding to the I-frame, for example, the packet 18 shown in the figure. Then, the FCC server forward moves the found audio packet corresponding to the I-frame to the first audio TS packet location after the I-frame, and an original audio packet at the location is discarded. After a forward movement location interval is determined, a quantity of TS packets that are of this packet identifier PID type and for which the audio packet is forward moved is calculated, subsequent audio packets are forward moved in sequential order, and adjusted insertion locations are original locations of audio TS packets in the TS packets. As shown in the figure, the packet 18 is forward moved to an original location of the packet 4, and subsequent audio packets 22, 24, and 26 are forward moved to original locations of the packets 8, 10, and 11 in sequential order. This manner can ensure that in an RTP packet, only the audio TS packets are changed, and other packet data is unchanged. Moreover, adjusted locations of the audio packets are in a one-to-one correspondence with locations of original audio packets, and an adjustment manner is relatively simple.

In the phase 2, to make an adjusted audio and video packet consistent with an original multicast packet, an audio and video difference of N milliseconds needs to be restored to the original audio and video difference of M milliseconds, and therefore, a transitional phase definitely exists.

In the phase 2, the audio TS packet is not forward moved any more, and to avoid sending a duplicate TS packet to the STB, an adjusted audio packet is replaced with a null packet. In a time period of the phase 2, all audio packets are replaced with null packets, no audio data exists in this period of time, and audio data corresponding to a video frame in the phase 2 can appear only after (M−N) milliseconds, that is, maximum duration of the phase 2 is (M−N). Therefore, it needs to be ensured that enough data is used as a cache in the phase 1 and the phase 2, and that after the phase 2 ends, that is, before a new audio frame arrives, a data caching time in a process of the phase 1 is enough for performing decoding and playback by the STB at a ix speed.

In the phase 3, after sending streams to the STB in the phase 2, the FCC server totally switches to a channel multicast packet phase with the original audio and video interval. In this phase, a structure of a TS packet of an original multicast RTP packet is retained, and no adjustment is performed. A subsequent procedure of instructing the STB to join multicast and leave unicast is consistent with an original procedure. After the STB is offline for seconds, the FCC server destructs a packet sending queue of the channel of the user.

Figure 6A:
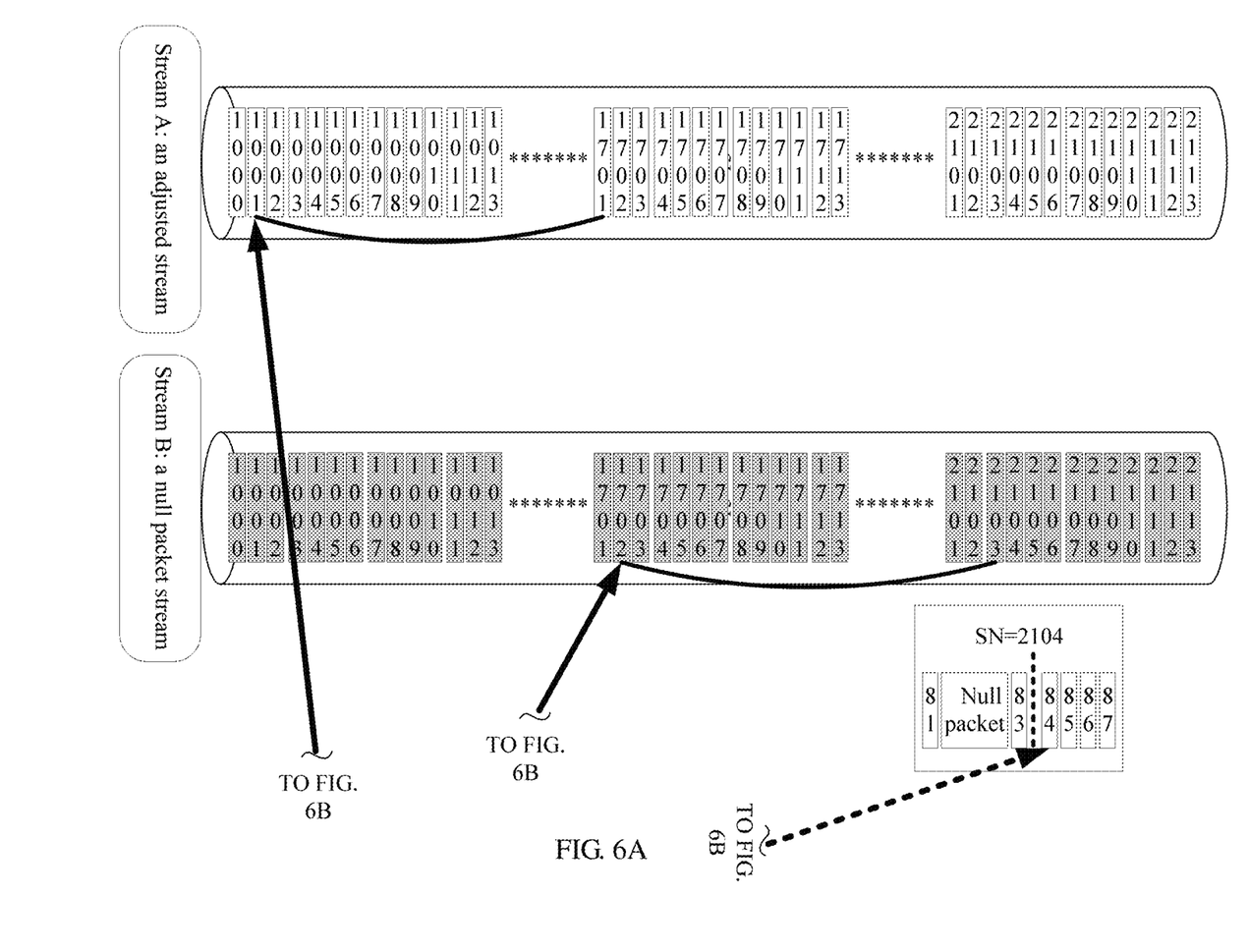
FIG. 6A and FIG. 6B are a schematic diagram of a multicast packet adjustment manner according to another embodiment of the present invention.
Figure 6B:
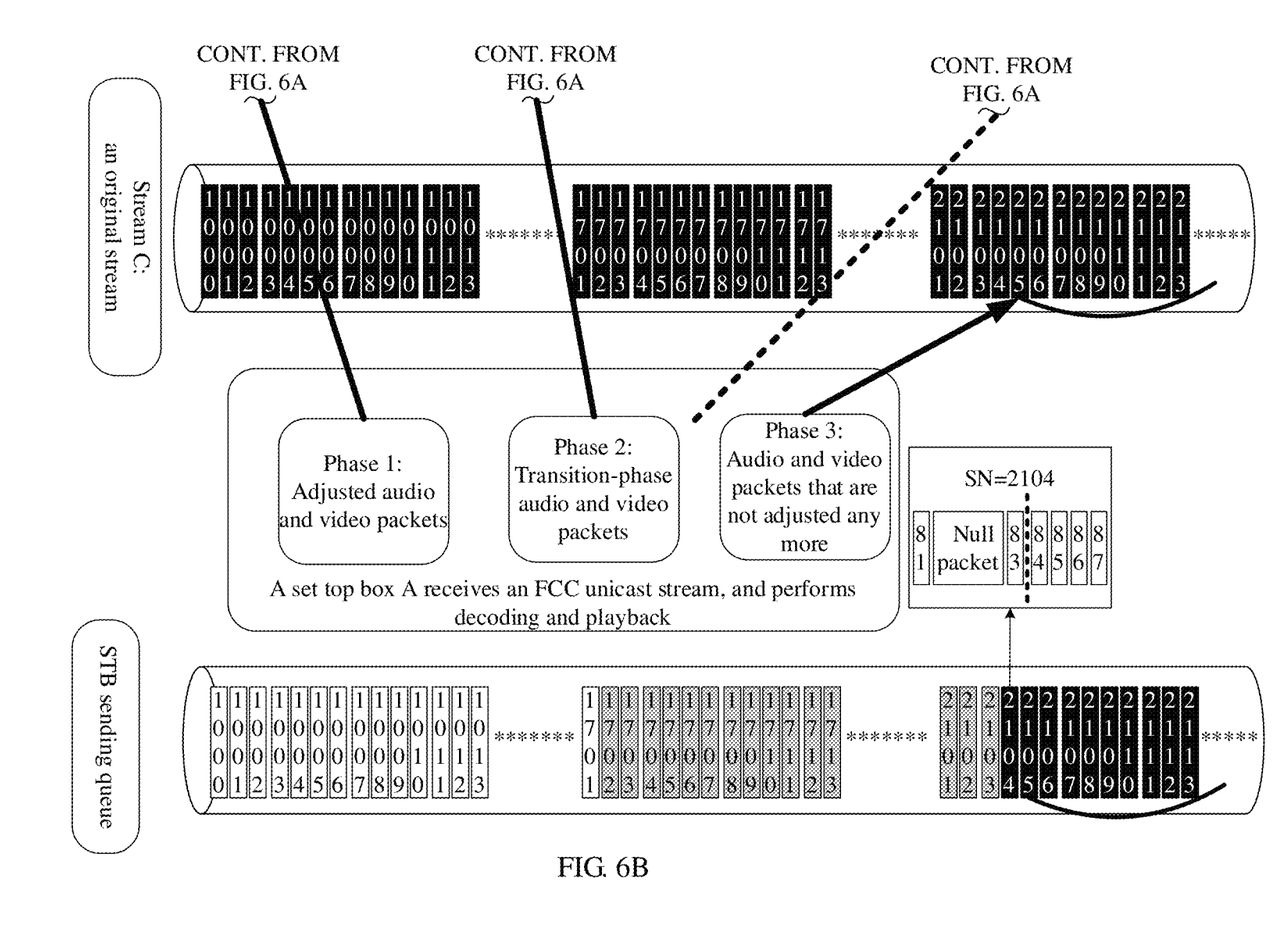

FIG. 6A and FIG. 6B are a schematic diagram of a method for adjusting, by an FCC server, an audio and video interval according to another embodiment of the present invention. FIG. 6A and FIG. 6B show the following.

The method simplifies a process of the three phases in which the FCC server sends a unicast stream to the STB in the embodiment of FIG. 5A, FIG. 5B, and FIG. 5C. An audio and video adjustment is performed at a channel granularity, and the FCC server replicates a multicast packet received from each channel multicast group into three channel streams: an adjusted packet obtained after a time interval between an audio packet and a video packet is adjusted and re-encapsulation is performed, a transitional packet obtained after an audio packet is replaced with a null packet, and an original packet on which no processing is performed. An audio and video adjustment does not need to be separately performed for each user. Only start locations at which each user sends a packet in the three phases need to be calculated.

Details are as follows.

(1) The FCC server performs an audio and video adjustment by channel, detects an audio and video interval when the channel is online, and performs an audio and video interval adjustment.

(2) Replicate and adjust each channel multicast stream into three packet streams, which are in a one-to-one correspondence with RTP sequence numbers. (A) Stream A: an adjusted packet stream obtained after the audio and video interval is adjusted. (B) Stream B: a transitional packet stream obtained after an audio packet is replaced with a null packet. (C) Stream C: an original multicast packet stream.

(3) Create a stream sending linked list queue of a user after an FCC request sent by the user is received.

Phase 1: Insert a linked list queue into the stream A, and send a stream by using the stream A obtained after the audio and video interval is adjusted, for example, TS packets 1001 to 1701 shown in the figure.

Phase 2: Insert a linked list queue into the stream B, and send a stream by using the stream B obtained after the audio packet is replaced, for example, TS packets 1702 to 2103 shown in the figure.

Phase 3: Insert a linked list queue into the stream C, and send a stream by using the stream C with an original audio and video sequence, for example, a TS packet 2104 and subsequent TS packets shown in the figure.

In the foregoing stream sending process, a calculation process of switching time points of the three phases is as follows.

Prerequisite: It is assumed that the original audio and video interval is M milliseconds, an adjusted audio and video interval is N milliseconds, and a burst rate of the FCC server is a 1.X speed.

(1) When the channel is started, calculate and store an audio and video time interval of the live channel, calculate a time interval difference $\Delta t$ needing to be adjusted (for example, if the original audio and video interval is M milliseconds, and needs to be adjusted below N milliseconds, $\Delta t=(M-N)$ milliseconds), and calculate a quantity $\Delta num$ of TS packets on which an audio forward movement adjustment is performed.

(2) When the user is online, directly enter the phase 1, and send a stream from the stream A.

(3) Time point for switching from the phase 1 to the phase 2: The time point is related to sending duration of the phase 2. First, the sending duration of the phase 2 is calculated, and the sending duration of the phase 2 is equal to $\Delta t/1.X$. Minimum sending duration of the phase 1 needs to be enough for the STB to cache data of $\Delta t$, that is, the duration of $\Delta t/1.X$. It may be learned from the foregoing that, the minimum sending duration of the phase 1, that is, a shortest time for switching to the phase 2, is equal to $\Delta t/1.X/0.X$.

(4) Time point for switching from the phase 2 to the phase 3: Time for switching from the phase 2 to the phase 3. The time is not obtained by means of conversion according to the time point, but is determined according to a quantity of audio null packets that have been sent. After the calculated quantity of sent null packets is equal to $\Delta num$, the phase 3 is entered to use an original multicast stream to send a packet.

Note: Special switching point from the phase 2 to the phase 3: In an RTP packet at this switching point, it is possible that the first half belongs to the stream B (the last audio needs to be padded with a null packet), but the second half belongs to the stream C (a next audio packet needs to be an original audio stream instead of a null packet). Therefore, at this switching point, the FCC server needs to dynamically encapsulate a packet, for example, a packet SN=2104 shown in the figure.

(5) In the phase 3, a subsequent packet sending procedure is kept consistent with an original packet sending procedure.

According to the foregoing audio and video time interval adjustment manner, a multicast stream received by each user does not need to be separately performed, so that calculation complexity is reduced, calculation load of the FCC server is reduced, and use efficiency is improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, at a fast channel change (FCC) server of an Internet Protocol (IP) television (IPTV) system, an FCC request from user equipment;
determining a channel multicast stream according to the FCC request;
in a first duration, adjusting time intervals between associated video packets and audio packets in channel multicast packets of the channel multicast stream, to generate a plurality of adjusted-phase packets, and sending the plurality of adjusted-phase packets to the user equipment; and
in a second duration, replacing audio packets in channel multicast packets of the channel multicast stream with null packets, to generate a plurality of transition-phase packets, and sending the plurality of transition-phase packets to the user equipment, wherein the second duration is immediately after the first duration, wherein no packet having an audio packet replaced with a null packet is sent in the first duration, and no packet having an adjusted time interval between an associated video packet and audio packet is sent in the second duration.

2. The method according to claim 1, further comprising:
before sending the plurality of adjusted-phase packets, joining a channel multicast group, and receiving a first channel multicast packet from the channel multicast group.

3. The method according to claim 1, further comprising:
determining a video packet having a start I-frame in the channel multicast packets of the channel multicast stream;
searching for and obtaining, according to a presentation time stamp (PTS) of the video packet having the start I-frame, a first audio packet corresponding to the video packet having the start I-frame;
determining a first audio packet location after the video packet having the start I-frame;
replacing an audio packet at the first audio packet location with the first audio packet;
determining an original location of the first audio packet;
calculating a forward movement interval of the first audio packet according to the original location of the first audio packet and the first audio packet location; and
forward moving, in sequential order according to the forward movement interval, second audio packets subsequent to the first audio packet, to replace audio packets at forward movement locations.

4. A fast channel change (FCC) server, comprising:
a transmitter;
a receiver, configured to receive an FCC request sent by user equipment;
a processor, configured to:
determine a channel multicast stream according to the FCC request sent by the user equipment;
in a first duration, adjust time intervals between associated video packets and audio packets in channel multicast packets of the channel multicast stream, to generate a plurality of adjusted-phase packets, and send, using the transmitter, the plurality of adjusted-phase packets to the user equipment; and
in a second duration, replace audio packets in channel multicast packets of the channel multicast stream with null packets, to generate a plurality of transition-phase packets, and send, using the transmitter, the plurality of transition-phase packets to the user equipment, wherein the second duration is immediately after the first duration, wherein no packet having an audio packet replaced with a null packet is sent in the first duration, and no packet having an adjusted time interval between an associated video packet and audio packet is sent in the second duration.

5. The FCC server according to claim 4, wherein the processor is configured to access a channel multicast group.

6. The FCC server according to claim 5, wherein the processor is configured to:
determine a video packet having a start I-frame in the channel multicast packets of the channel multicast stream;
search for and obtain, according to a presentation time stamp (PTS) of the video packet having the start I-frame, a first audio packet corresponding to the video packet having the start I-frame;
determine a first audio packet location after the video packet having the start !-frame; and
replace an audio packet at the first audio packet location with the first audio packet.

7. The FCC server according to claim 6, wherein the processor is further configured to:
determine an original location of the first audio packet;
calculate a forward movement interval of the first audio packet according to the original location of the first audio packet and the first audio packet location; and
forward move, in sequential order according to the forward movement interval, second audio packets subsequent to the first audio packet, to replace audio packets at forward movement locations.

8. An IPTV system, comprising
the FCC server according to claim 4; and
a content providing system, configured to: after the fast channel change server accesses a channel multicast group, multicast channel media content to the fast channel change server by using the channel multicast stream.

9. The IPTV system according to claim 8, further comprising:
a user equipment, comprising:
a transmitter, configured to send the FCC request to the FCC server;
a receiver, configured to receive the plurality of adjusted-phase packets; and
a processor, configured to parse and play the plurality of adjusted-phase packets.

10. A user equipment, comprising:
a transmitter, configured to send a fast channel change (FCC) request to an FCC server;
a receiver, configured to:
receive, in a first duration, a plurality of adjusted-phase packets sent by the FCC server based on the FCC request, wherein in the plurality of adjusted-phase packets time intervals between associated video packets and audio packets in channel multicast packets of a channel multicast stream have been adjusted; and receive, in a second duration, a plurality of transition-phase packets, wherein in the plurality of transition-phase packets audio packets in channel multicast packets of the channel multicast stream have been replaced with null packets, wherein the second duration is immediately after the first duration, and wherein no packet having a an audio packet replaced with a null packet is sent in the first duration, and no packet having an adjusted time interval between an associated video packet and audio packet is sent in the second duration; and a processor, configured to parse and play the plurality of adjusted-phase packets.

11. The user equipment according to claim 10, wherein the processor is further configured to parse the plurality of transition-phase packets.

12. The method according to claim 1, further comprising:
performing, by the FCC server, decapsulation processing on the channel multicast stream.

13. The user equipment according to claim 10, wherein the FCC request comprises a target channel.

14. The user equipment according to claim 13, wherein the FCC server is selected according to the target channel.

* * * * *

UNITED STATES PATENT AND TRADEMARK OFFICE
CERTIFICATE OF CORRECTION

PATENT NO.        : 10,645,447 B2
APPLICATION NO.   : 16/003547
DATED             : May 5, 2020
INVENTOR(S)       : Yahui Xu Page 1 of 1

It is certified that error appears in the above-identified patent and that said Letters Patent is hereby corrected as shown below:

In the Claims

In Column 14, Line 31, Claim 6, delete "!-frame" and insert --I-frame--.

Signed and Sealed this
Eighteenth Day of August, 2020

Andrei Iancu
*Director of the United States Patent and Trademark Office*